US008164223B2

(12) United States Patent
Kawai

(10) Patent No.: US 8,164,223 B2

(45) Date of Patent: Apr. 24, 2012

(54) LINEAR MOTOR MOUNTING STRUCTURE

(75) Inventor: Yoichi Kawai, Aichi (JP)

(73) Assignee: OKUMA Corporation, Aichi (JP)

( * ) Notice: Subject to any disclaimer, the term of this patent is extended or adjusted under 35 U.S.C. 154(b) by 232 days.

(21) Appl. No.: 12/396,149

(22) Filed: Mar. 2, 2009

(65) Prior Publication Data

US 2009/0218893 A1 Sep. 3, 2009

(30) Foreign Application Priority Data

Mar. 3, 2008 (JP) .................................. 2008-51546

(51) Int. Cl.
*H02K 41/03* (2006.01)

(52) U.S. Cl. ................ 310/12.15; 310/12.27; 310/12.31

(58) Field of Classification Search ............... 310/12.15, 310/12.31, 12.27
See application file for complete search history.

(56) References Cited

U.S. PATENT DOCUMENTS

| | | | | |
|---|---|---|---|---|
| 5,191,246 | A * | 3/1993 | Roxborough | 310/13 |
| 6,441,515 | B1 * | 8/2002 | Shimura | 310/12.19 |
| 7,154,198 | B2 | 12/2006 | Kawai | |
| 7,242,117 | B2 * | 7/2007 | Sugita et al. | 310/12.15 |
| 7,312,540 | B2 * | 12/2007 | Miyamoto et al. | 310/12.01 |
| 2003/0141768 | A1 * | 7/2003 | Kim | 310/12 |
| 2008/0001481 | A1 * | 1/2008 | Miyaji et al. | 310/12 |
| 2009/0218893 | A1 * | 9/2009 | Kawai | 310/12.24 |
| 2010/0225180 | A1 * | 9/2010 | Kawai | 310/12.26 |

FOREIGN PATENT DOCUMENTS

| | | |
|---|---|---|
| JP | 08280166 | * 10/1996 |
| JP | 2000299973 | * 10/2000 |
| JP | 2001054274 | * 2/2001 |
| JP | 2001-119919 | 4/2001 |
| JP | 2001190057 | * 7/2001 |
| JP | 2001224159 | * 8/2001 |
| JP | 2002-101636 | 4/2002 |
| JP | 2005-137140 | 5/2005 |
| JP | 2005-185061 | 7/2005 |
| JP | 2006-109653 | 4/2006 |
| JP | 2010029026 | * 2/2010 |

OTHER PUBLICATIONS

Machine Translation of JP 2001-054274, "Linear Motor", Tamotsu Nose, Feb. 23, 2001.*

Machine Translation of JP 2000-299973, "Linear Actuator", Takahashi et al., Oct. 24, 2000.*

(Continued)

*Primary Examiner* — Karl Tamai

(74) *Attorney, Agent, or Firm* — Osha Liang LLP

(57) ABSTRACT

The present invention provides a magnetic attractive force-offsetting linear motor which prevents motor thrust from varying due to changes in the position on a stator, thus enabling improvement of the motor thrust and of the accuracy of the machine tool and the quality of a processed surface. A magnetic attractive force offsetting linear motor has a base 72 that fix stators **52*a* and 52*b* by contacting stator bottom surfaces 74, two stator mounting members each provided on a side of a corresponding one of the stators 52*a* and 52*b* and each extending from the base 72 to a height substantially equal to that of a stator top surface 73, and two plate-like support members 81 fixedly connected to the stator top surfaces of the respective two stators 52*a* and 52*b* and to a base top surface 84**.

3 Claims, 10 Drawing Sheets

73 75 57 54 δx $F_m$ 84 52b δx $F_m$ 83 71 81 84 82 82 64 51 76 74 59 52a 72 85

OTHER PUBLICATIONS

Machine Translation of JP 08-280166, "Linear Motor", Suganuma et al., Oct. 1996.*
esp@cenet patent abstract for Japanese Publication No. 2002101636, Publication date Apr. 5, 2002 (1 page).
esp@cenet patent abstract for Japanese Publication No. 2005185061, Publication date Jul. 7, 2005 (1 page).
esp@cenet patent abstract for Japanese Publication No. 2006109653, Publication date Apr. 20, 2006 (1 page).
esp@cenet patent abstract for Japanese Publication No. 2005137140, Publication date May 26, 2005 (1 page).
esp@cenet patent abstract for Japanese Publication No. 2001119919, Publication date Apr. 27, 2001 (1 page).

* cited by examiner

LINEAR MOTOR MOUNTING STRUCTURE

PRIORITY INFORMATION

This application claims priority to Japanese Patent Application No. 2008-51546 filed on Mar. 3, 2008, which is incorporated herein by reference in its entirety.

TECHNICAL FIELD

The present invention relates to a mounting structure for a linear motor used in an industrial device such as a machine tool.

BACKGROUND ART

Linear motors have been used in industrial devices such as machine tools in order to achieve high speed and high accuracy. In a linear motor, permanent magnets are provided in a movable member or a stator, such that a magnetic attractive force several times as strong as a thrust acts between the movable member and the stator. The magnetic attractive force may disadvantageously deform the machine tool to reduce processing accuracy. To solve this problem, a magnetic attractive force offsetting linear motor is used. See, for example, Japanese Patent Laid-Open No. 2005-137140 (Patent Document 1). The magnetic attractive force offsetting linear motor is composed of a movable member and two stators arranged parallel to each other so as to sandwich the movable member between the stators. Such a configuration allows a magnetic attractive force to be generated between each of the two stators and the movable member such that the generated magnetic attractive forces act in opposite directions so as to offset each other. This minimizes the overall magnetic attractive force, and helps preventing the magnetic attractive force from adversely affecting operation of the machine tool.

An example of a conventional linear motor will be described with reference to FIGS. 5 to 8. FIG. 5 is a diagram showing a general configuration of the conventional linear motor. FIG. 6 shows a sectional view taken along line C-C in FIG. 5. FIG. 7 is a diagram showing coils wound around the linear motor. FIG. 8 is a perspective view of a stator.

The linear motor has two stators 52*a* and 52*b* extending in parallel and a movable member 51 that is movable between the stators 52*a* and 52*b* along a direction in which the stators 52*a* and 52*b* extend.

Each of the stators 52*a* and 52*b* is formed of stacked electromagnetic steel plates. Each of the stators 52*a* and 52*b* has salient poles 50 arranged at a pitch P. As shown in FIG. 8, each of the stators 52*a* and 52*b* is produced to have a predetermined length. The plurality of pieces of each stator are arranged over a stroke length of the movable member 51 in a direction in which the movable member 51 moves. The stators 52*a* and 52*b* are fixed to, for example, a base 72 (shown in FIG. 6) of the machine tool. Specifically, as shown in FIGS. 6 and 8, each of the stators 52*a* and 52*b* is fixed to the base 72 by bolts 71 so that a bottom surface 74 of the stator contacts the base 72.

On the other hand, the movable member 51 is supported in such a manner that it can be moved, in the direction of an X axis in FIG. 5, by a rolling guide or the like provided between the base 72 and a table (not shown in the drawings) and fixed to the table. The movable member 51 is composed of movable member blocks 53, 54, and 55 each formed of stacked directional electromagnetic steel plates that exhibit an excellent magnetic characteristic in the direction of a Z axis that is perpendicular to the direction of the X axis, in which the movable member 51 advances. The movable member block 53 is for a U phase, the movable member block 54 is for a W phase, and the movable member block 55 is for a V phase. The movable member blocks 53, 54, and 55 are arranged such that each of the movable member blocks 53, 54, and 55 is displaced by 120° that is, by one-third of the magnetic pole pitch P of the stators 52*a* and 52*b*, relative to the direction of the X axis, in which the movable member 51 advances. A three-phase AC coil is wound around each of the movable member blocks 53, 54, and 55. That is, a three-phase AC coil 56 for the U phase is wound around the movable member block 53. A three-phase AC coil 57 for the W phase is wound around the movable member block 54. A three-phase AC coil 58 for the V phase is wound around the movable member block 55. The U, W, and V phases of the three-phase AC coils 56, 57, and 58 are connected together in the form of Y as shown in FIG. 7. The movable member blocks 53, 54, and 55 around which the three-phase AC coils 56, 57, and 58 are wound are integrated with one another with a mold resin 76

Permanent magnets 59 and 64 are arranged on a surface of each of the movable member blocks 53, 54, and 55 such that N poles and S poles alternate. Specifically, as shown in FIGS. 5B and 5C, three pairs each of an N-pole permanent magnet and an S-pole permanent magnet are arranged at the pitch P as shown in FIGS. 5B and 5C. Here, as shown in FIG. 5, when the stator 52*a* side is defined as SIDE-A and the stator 52*b* side is defined as SIDE-B, the permanent magnets 59 on the SIDE-A and the permanent magnets 64 on the SIDE-B are arranged such that the polarity on the SIDE-A is opposite that of the SIDE-B.

As described above, the three-phase AC coils 56, 57, and 58 are connected together in the form of Y. When a current is applied to the three-phase AC coils 56, 57, and 58 in the direction from U to V and W, a magnetic flux 62 is excited in the linear motor.

An example of operation of the linear motor will be described. When a current is applied to the three-phase AC coils 56, 57, and 58, the movable member blocks 53, 54, and 55 are excited in the plus or minus direction along the direction of the Y axis. As a result, the magnetic flux is strengthened in those of the permanent magnets 59 and 64 aligned in the same magnetization direction as the direction in which the AC coil is excited, while the magnetic flux is weakened in the remaining permanent magnets, those aligned in a magnetization direction opposite to the excitation direction. Thus, each of the permanent magnets 59 and 64 are excited to have either one of the opposite polarities, that is, to serve as either the N or S pole. The magnetic flux passing through the movable member block 53, 54, and 55 and the stators 52*a* and 52*b* side forms a magnetic path as shown at reference numeral 62 in FIG. 5A. At this point, a magnetic attractive force is generated depending on the positions of the movable member 51 and the stators 52*a* and 52*b*. Thus, a thrusting force is generated in the movable member 51, which is thus moved.

The flow of the magnetic flux will be described in further detail using an example in which a current is directed from the U phase to the V and W phases, that is, the current flows through the three-phase AC coil 56 in the winding direction shown in FIG. 5A and through the three-phase AC coils 57 and 58 in the direction opposite to the winding direction shown in FIG. 5A. Then, the SIDE-A of the movable member block 53 becomes the S pole, and the SIDE-B thereof becomes the N pole. In contrast, the SIDE-A of the movable member blocks 54 and 55 becomes the N pole, where the SIDE-B thereof becomes the S pole. Thus, as shown in FIG. 5A, the magnetic path 62 is formed such that the magnetic flux flows from the movable member block 53 through the stator 52*b* to the movable member blocks 54 and 55 and then returns through the stator 52*a* to the movable member block 53. Then, the magnetic attractive force acts on the movable member 51 in the direction of the X axis to generate a thrust in the movable member 51.

DISCLOSURE OF THE INVENTION

Problems to be Solved by the Invention

Problems with the above-described linear motor will be summarized below.

In the above-described configuration, the stators 52*a* and 52*b* of the magnetic attractive force offsetting linear motor are fixed to the base 72. Specifically, as shown in FIG. 6, the stators 52*a* and 52*b* are fixed such that the stator bottom surface 74, corresponding to the bottom surface of each of the stators 52*a* and 52*b*, contacts the base 72. However, a stator top surface 73 corresponding to a top surface of each of the stators 52*a* and 52*b* is not fixed. Thus, the stators 52*a* and 52*b* disadvantageously exhibit a low rigidity. In particular, in the conventional linear motor shown in FIGS. 5 and 6 and in which each of the stators 52*a* and 52*b* is composed of the stacked electromagnetic steel plates, the electromagnetic steel plates are stacked in the direction perpendicular to the direction in which the magnetic attractive force acts. Thus, the force acts in a lateral direction in which the electromagnetic steel plates are shifted, disadvantageously significantly reducing the rigidity of the stators 52*a* and 52*b*.

Furthermore, in the stators 52*a* and 52*b* described above, only the stator top surface 73 is bent by the magnetic attractive force. Thus, an air gap between the movable member 51 and each of the stators 52*a* and 52*b* is reduced only on the stator top surface 73. Moreover, the pieces of each of the stators 52*a* and 52*b* are arranged in the moving direction of the movable member 51. Thus, the rigidity of each of the stators 52*a* and 52*b* varies among the pieces of the stator depending on the status of stacking of the electromagnetic steel plates. Consequently, the air gap between the movable member 51 and each of the stators 52*a* and 52*b* varies depending on the position on the stator. As a result, the motor thrust may disadvantageously vary depending on the position on each of the stators 52*a* and 52*b*.

Furthermore, in a conventional linear motor as described, the three-phase AC coils 56, 57, and 58 provided on the movable member 51 side are energized to excite the stators 52*a* and 52*b* through the air gap, which offers a high magnetic resistance. Thus, the thrust increases with decreasing air gap. The air gap needs to be predetermined in view of the amount by which the stators 52*a* and 52*b* are expected to be bent. Then, the air gap needs to be larger than the desired value, disadvantageously resulting in a reduced motor thrust.

Moreover, for motor control, gain must be increased in order to improve feedback controllability. However, the increased gain causes the stators with low rigidity to vibrate. This prevents the gain from being increased to the desired value, leading to a significant positional error. Thus, the accuracy of the machine tool and the quality of a processed surface may disadvantageously be degraded.

The present invention solves at least one of these problems. The present invention first provides a linear motor adapted to prevent the motor thrust from varying depending on the position on the stator.

The present invention also provides a linear motor that allows the motor thrust to be improved.

The present invention still further provides a linear motor that allows improvements of the accuracy of the machine tool and the quality of the processed surface.

Means for Solving the Problems

The present invention provides a linear motor mounting structure allowing mounting of a linear motor comprising two stators extending in parallel and a movable member, the mounting structure being characterized by comprising a base contacting bottom surfaces of the stators to fix the stators, two stator mounting members each extending from the base to a height substantially equal to a height of a top surface of the stator, and two plate-like support members fixedly connected to the top surfaces of the two stators and top surfaces of the two stator mounting members, and wherein the bottom surface of each of the stators is fixed to the base, and the top surface of the stator is fixed to the corresponding stator mounting member via the corresponding plate-like support member.

Furthermore, the base and the two stator mounting members may be integrated together so as to have a U-shaped cross section. The bottom surface of each of the stators may be fixed to a bottom portion of the cross section U shape of the base. The top surface of the stator may be fixed to a top surface of cross section U shape of the base via the corresponding plate-like support member.

Furthermore, a gap may be created between each of the stators and a side wall of the corresponding stator mounting member.

Moreover, when maximum allowable displacement of the air gap is defined as $\delta x$, plate thickness is defined as t, a measured coefficient is defined as K, a magnetic attractive force exerted on the top surface of the stator is defined as Fm, width of the plate-like support member is defined as W, and allowable stress of a material is defined as $\sigma$, the thickness t of the plate-like support member may be set to $\sqrt[3]{(\delta x/K)} \geqq t \geqq Fm/(W\sigma)$.

Advantages of the Invention

By employing a linear motor according to the present invention, variations in motor thrust due to the relative position of the stator can be prevented. Furthermore, because the stators and the movable member can be mounted with the air gap between each of the stators and the movable member set to a predetermined value, the motor thrust to be improved. Moreover, for motor control, rigidity is improved to enable an increase in gain, thereby improving feedback controllability and reducing positional error. Consequently, the accuracy of a machine tool and the quality of a processed surface can be improved.

BEST MODE FOR CARRYING OUT THE INVENTION

Embodiments of the present invention will be described below with reference to the drawings.

Figure 1:
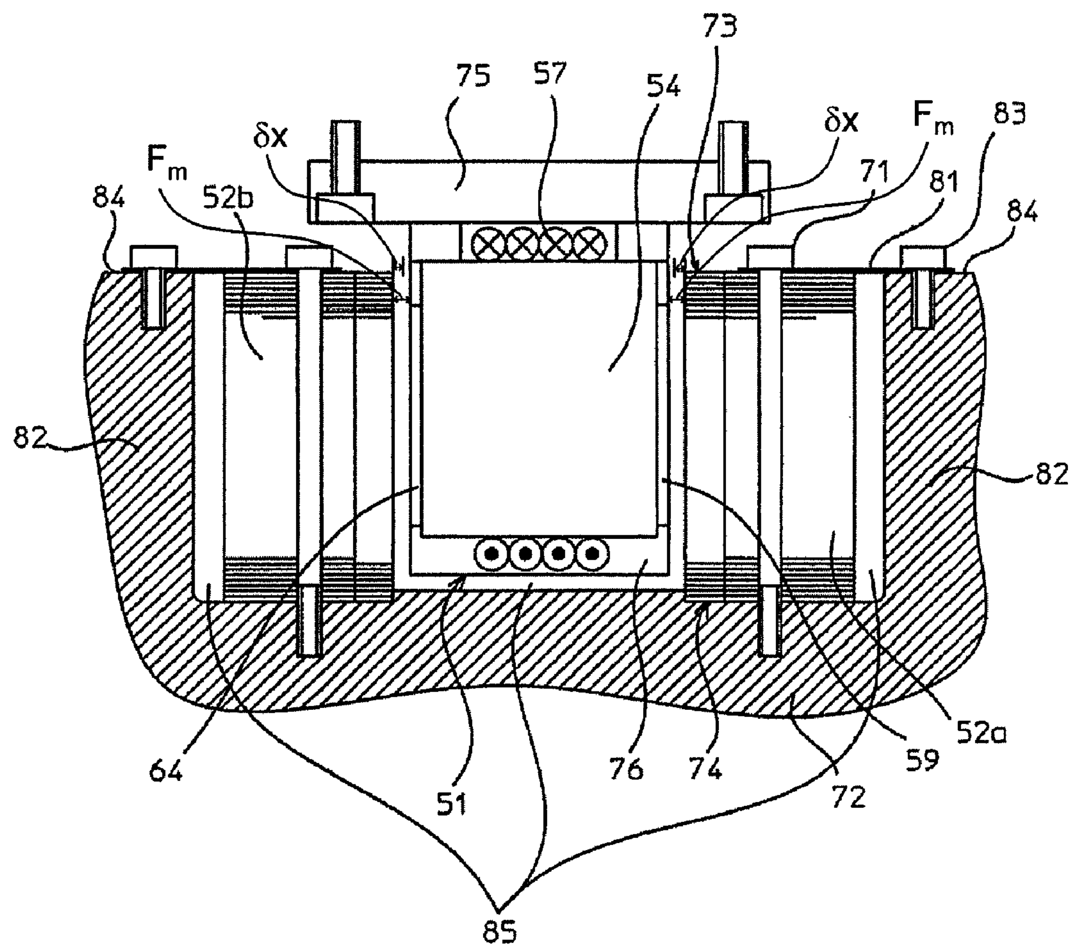
FIG. 1 is a diagram showing a mounting structure for a linear motor according to the present embodiment.
Figure 2:
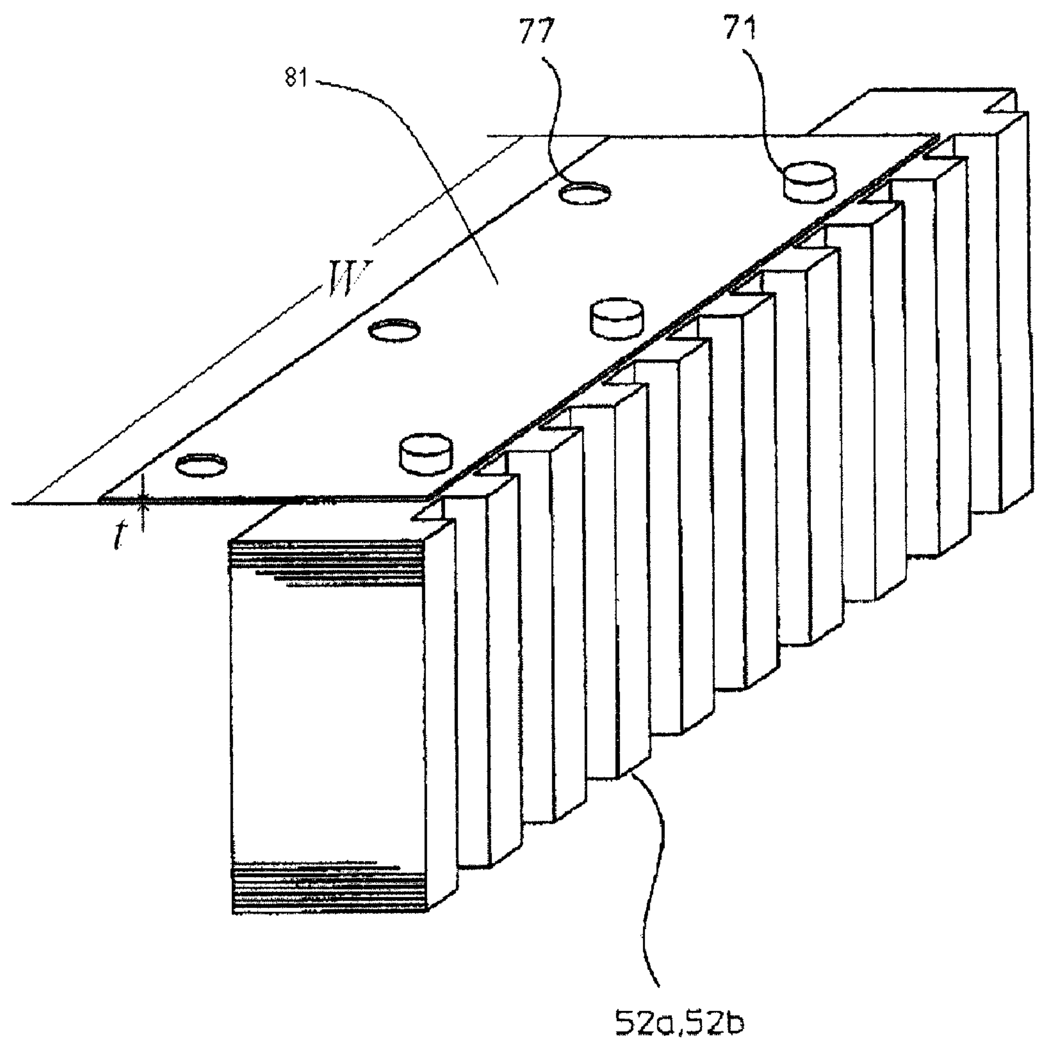
FIG. 2 is a perspective view of a stator.

FIG. 1 is a diagram showing a mounting structure for a linear motor according to one embodiment of the present invention, while FIG. 2 is a perspective view of a stator. The linear motor has two stators 52*a* and 52*b* extending in parallel, a movable member 51 that is movable between the stators 52*a* and 52*b* along a direction in which the stators 52*a* and 52*b* extend, and a base 72 to which the stators 52*a* and 52*b* are fixed. Here, for the movable member 51 and the stators 52*a* and 52*b*, components which correspond to those in the conventional art described above are denoted by the same reference numerals and will not be described in detail below.

The base 72 is formed to have a U-shaped cross section. In FIG. 1, reference numerals for the base 72 denote the following components. Reference numeral 85 denotes a U-shaped groove formed in the base 72. Reference numeral 82 denotes a U-shaped groove side surface wall formed as a side wall of the base 72. Reference numeral 84 denotes an end of the U shape, in other words, a base top surface corresponding to a top surface of the base 72. The base top surface 84 is formed at a height substantially equal to that of the stator top surface 73. A flat plate-like support member 81 is located so as to bridge the base top surface 84 and the stator top surface 73. As shown in FIG. 2, a plurality of bolt holes 77 are formed in the plate-like support member 81. The plate-like support member 81 is fixed to the base top surface 84 by bolts 83 and to the stator top surface 73 by the bolts 71. Thus, the stators 52*a* and 52*b* are fixed to a bottom portion of the U-shaped groove 85 via the bolts 71 and to the base top surface 84 of the base 72 via the plate-like support member 81 fixed to the stator top surface 73.

In the stators 52*a* and 52*b* configured as described above, the stator top surface 73 is supported by the base top surface 84 via the plate-like support member 81. This prevents the stators 52*a* and 52*b* from being bent toward the movable member 51. Thus, the air gap x between the movable member 51 and each of the stators 52*a* and 52*b* can be kept uniform between the stator top surface 73 and the stator bottom surface 74. Furthermore, since the stator top surface 73 is fixed to the base 72 by the plate-like support member 81, the rigidity of the stators 52*a* and 52*b* is improved. As a result, variations in motor thrust due to the positions of the stators 52*a* and 52*b* can be prevented. Additionally, the stators 52*a* and 52*b* and the movable member 51 can be mounted such that a predetermined air gap is provided between each of the stators 52*a* and 52*b* and the movable member 51. As such, any need to set the air gap to a larger value to allow for expected bending of the stators 52*a* and 52*b* can be eliminated. The motor thrust is thus improved. Moreover, for motor control, rigidity is improved to enable an increase in gain. Thus, feedback controllability is improved to reduce a positional error. Consequently, the accuracy of a machine tool and the quality of a processed surface can be improved.

The optimum plate thickness of the plate-like support member 81 according to the present embodiment will be described. Each of the stators 52*a* and 52*b* is composed of stacked electromagnetic steel plates as in the conventional art described above. Thus, due to accumulated dimensional error, it is difficult to achieve a desired specific stacking thickness. As a result, the height of the stator top surface 73 differs from that of the base top surface 84. Pressure is exerted on the stators 52*a* and 52*b* through the plate-like support member 81. The pressure bends the stators 52*a* and 52*b* toward the movable member 51 to change the gap. Here, when the maximum allowable displacement of the air gap is defined as δx, the plate thickness of the plate-like support member 81 is defined as t, and the measured coefficient is defined as K, the maximum allowable displacement is $\delta x = Kt^3$. Thus, the maximum plate thickness of the plate-like support member 81 is $t = \sqrt[3]{(\delta x/K)}$.

Specifically, the maximum plate thickness of the plate-like support member 81 is determined as follows. The difference in level between the stator top surface 73 and the base top surface 84 is set to an assumed maximum value. The plate-like support member 81 with the plate thickness t is used to fix the stators 52*a* and 52*b*. The current displacement of the air gap is determined, and based on the result, the coefficient K is determined. According to the above-described relationship (the maximum allowable displacement $\delta x = Kt^3$), the plate thickness t corresponding to the maximum allowable plate thickness is determined.

Here, the minimum plate thickness of the plate-like support member 81 must be set such that a repeated stress caused by a magnetic attractive force is less then or equal to the allowable stress of the material. Here, when the magnetic attractive force exerted on the stator top surface 73 is defined as Fm, the width of the plate-like support member 81 is defined as W, and the allowable stress of the material is defined as σ, the minimum plate thickness is $t = Fm/(W\sigma)$. Thus, the optimum plate thickness of the plate-like support member 81 may be set within the range determined by:

$$\sqrt[3]{(\delta x/K)} \geqq t \geqq Fm/(W\sigma)$$

It is preferable that a gap as shown in FIG. 1 is created between each of the stators 52*a* and 52*b* and the U-shaped groove side surface wall 82. If the height of the stator top surface 73 differs from that of the base top surface 84, bending of the stators 52*a* and 52*b* can be minimized by increasing the distance between the bolts 71 and 83 to reduce the flexural rigidity of the plate-like support member 81 and thus the pressure exerted on the stators 52*a* and 52*b* through the plate-like support member 81.

Figure 3:
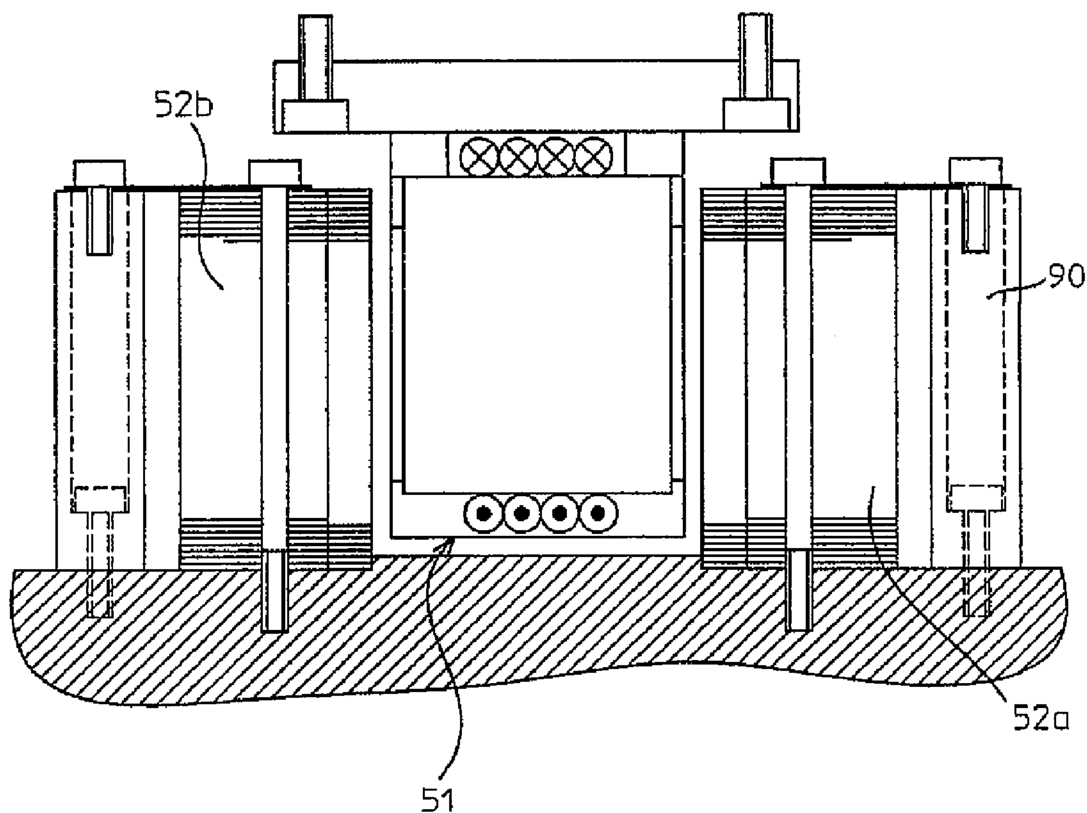
FIG. 3 is a diagram showing a mounting structure for a linear motor according to another embodiment.

FIG. 3 is a diagram showing a mounting structure for a linear motor according to another embodiment. The U-shaped groove side surface wall 82 shown in FIG. 1 is formed by cutting a part of the base 72. In contrast, in FIG. 3, a stator mounting member 90 is fixed to the base 72 by bolts to form a cross section U shape. As a result, the stators 52*a* and 52*b* are mounted on a top surface of the stator mounting member 90 via the plate-like support member 81. Thus, effects similar to those of the above embodiment can be obtained.

Figure 4:
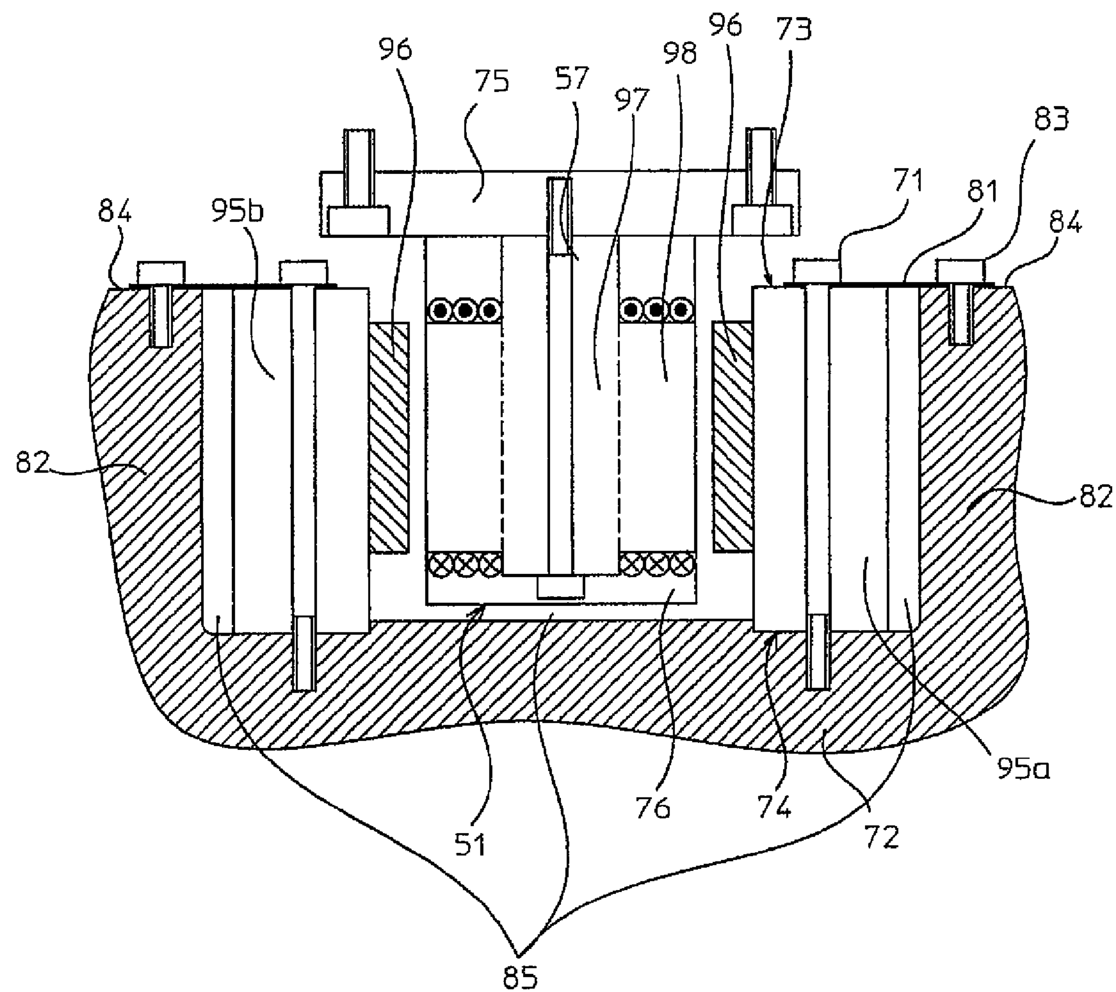
FIG. 4 is a diagram showing a mounting structure for a linear motor based on a different principle.
Figure 5A:
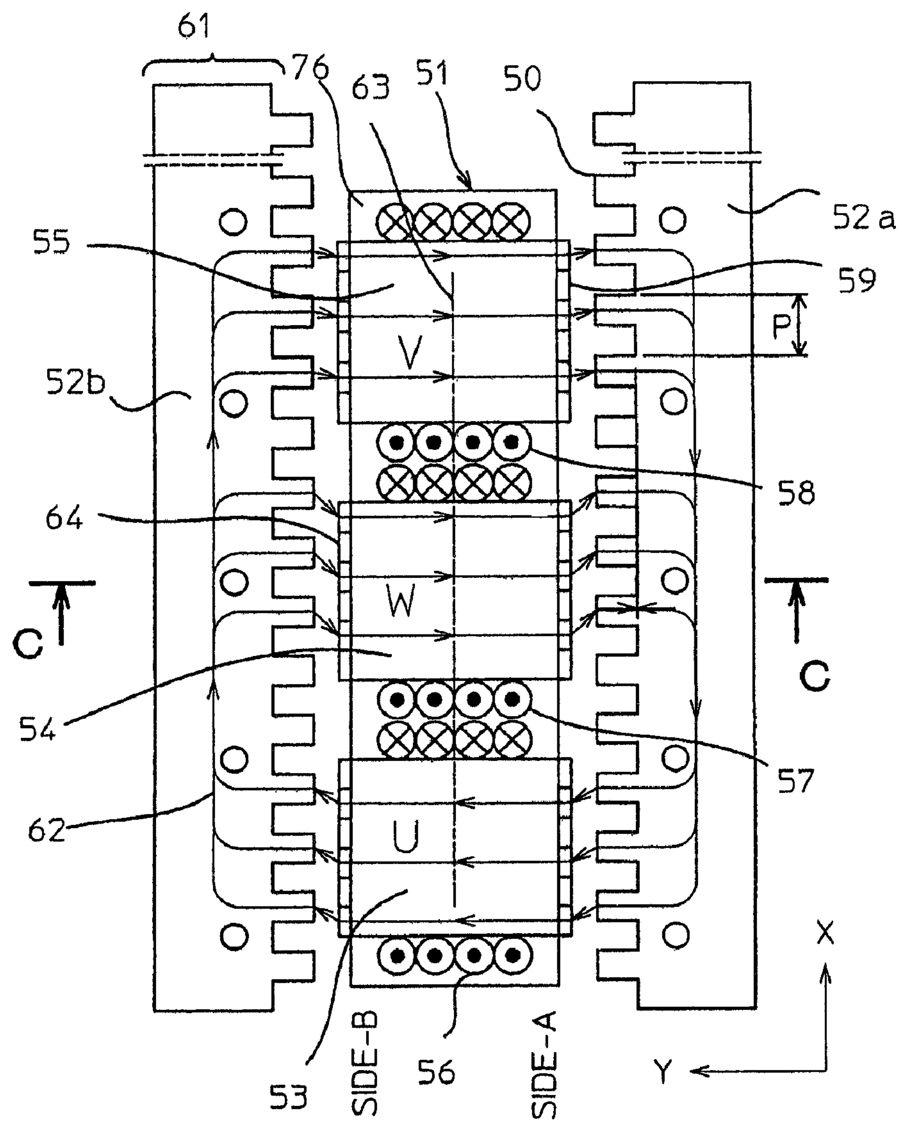
FIG. 5A is a diagram showing a general configuration of the linear motor.
Figure 5B:
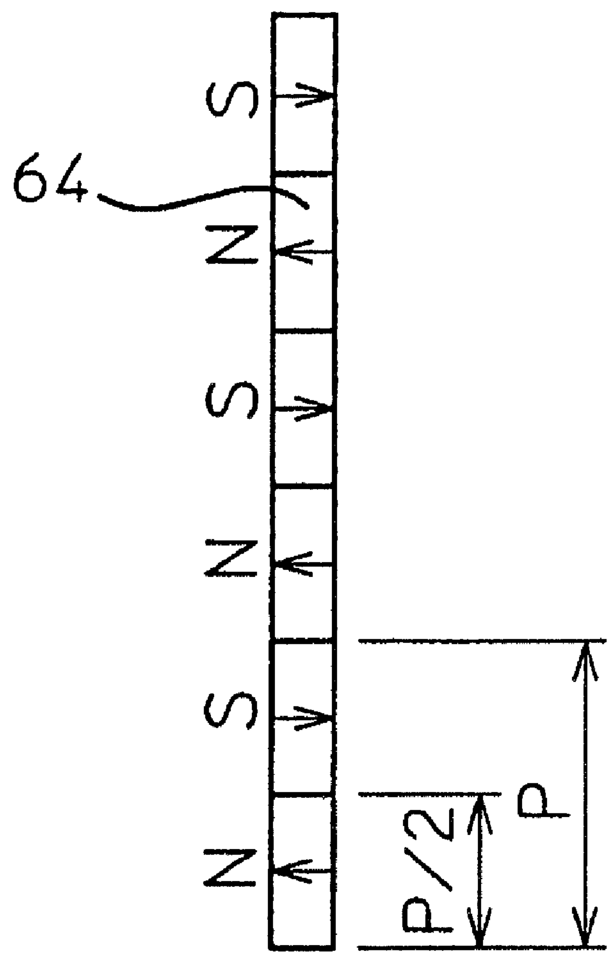
FIGS. 5B and 5C are diagrams showing arrangement of permanent magnets.
Figure 5C:
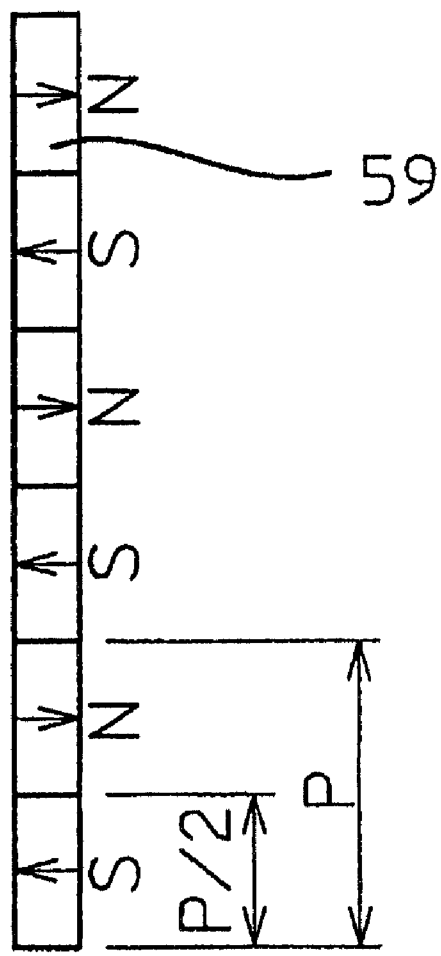
Figure 6:
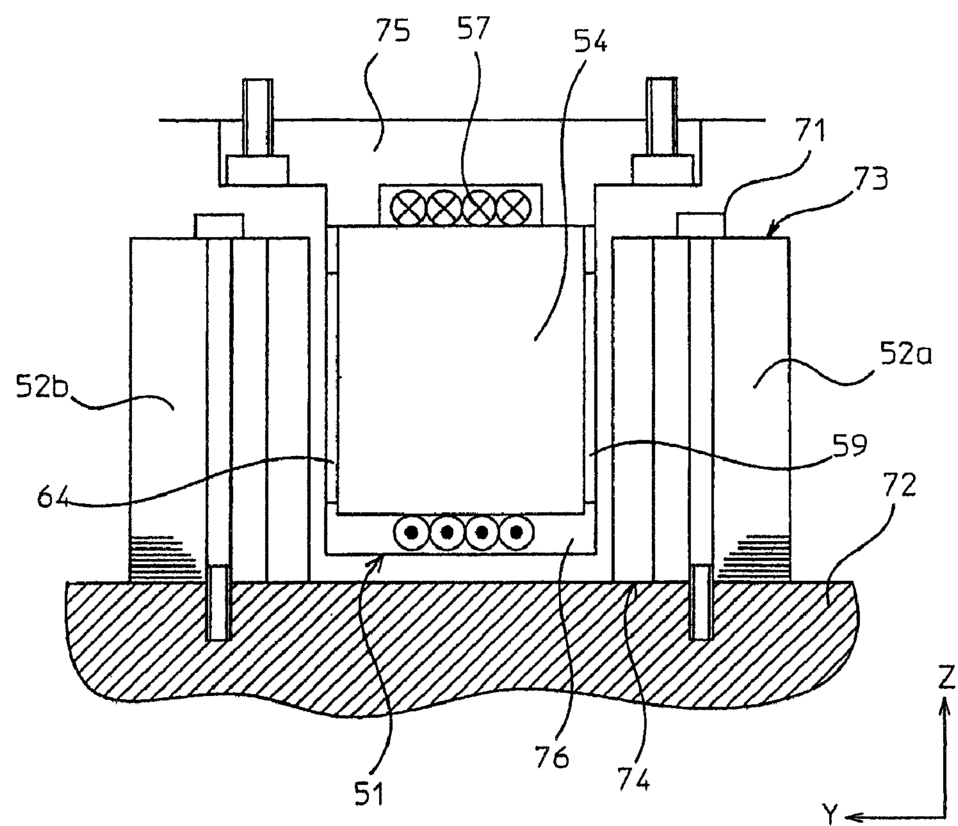
FIG. 6 is a sectional view taken along line C-C of the linear motor in FIG. 5A.
Figure 7:
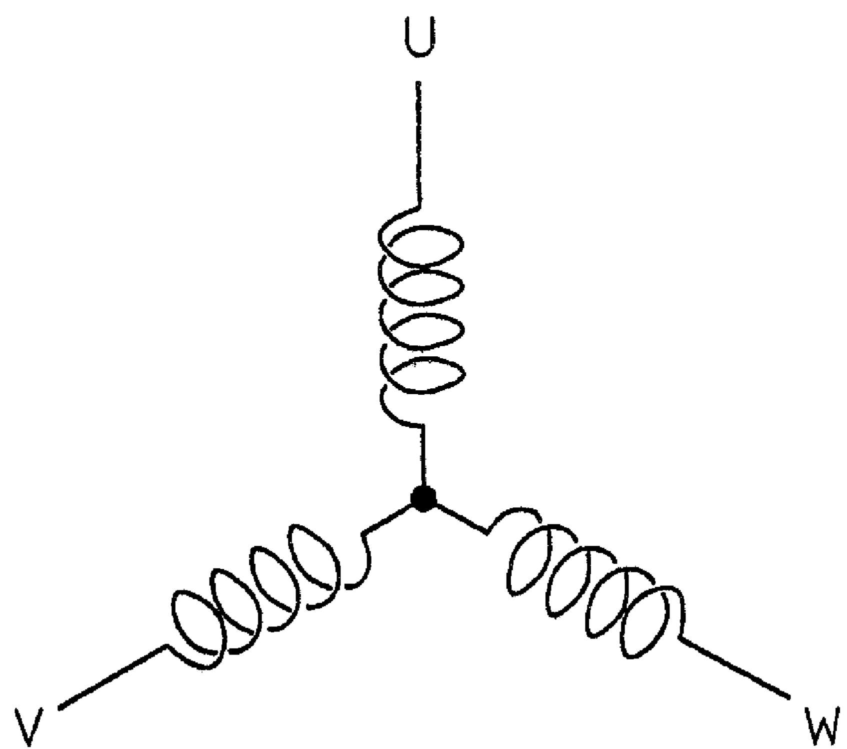
FIG. 7 is a diagram of coils wound around the linear motor.
Figure 8:
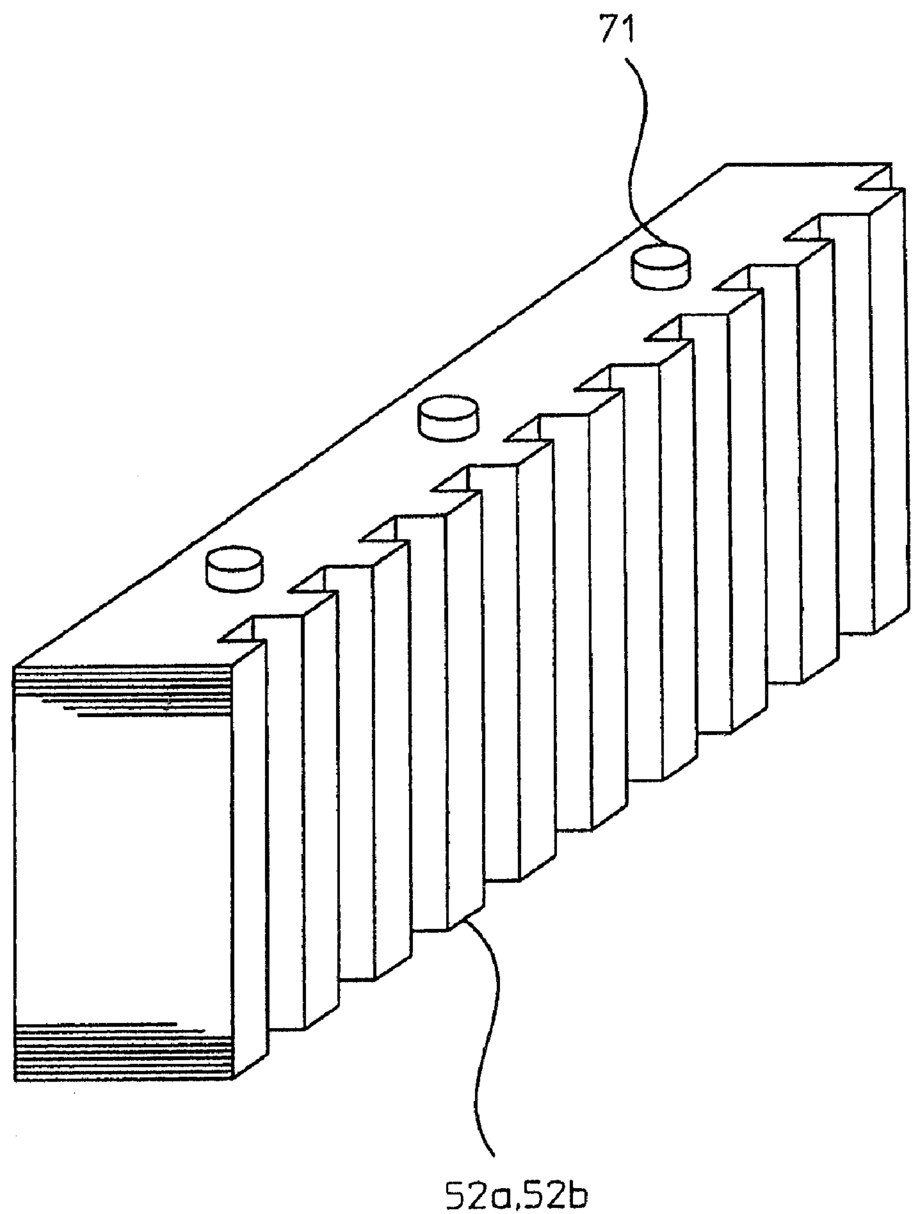
FIG. 8 is a perspective view of a stator.

FIG. 4 is a diagram showing a mounting structure for a linear motor based on a different principle. The linear motor in FIG. 4 is of a magnetic attractive force-offsetting surface magnet type commonly used for machine tools. Two stators 95*a* and 95*b* extending parallel to each other in the moving direction of the movable member 51 are each composed of rectangular parallelepipedic steel plates. Permanent magnets 96 are arranged on each of the opposite surfaces of the stators 95*a* and 95*b* at predetermined intervals in the moving direction of the movable member 51. On the other hand, the movable member 51, which moves between the two stators 95*a* and 95*b*, has comb teeth-like teeth portions 98 formed on surfaces of a movable member iron core 97 which are located opposite the stators 95*a* and 95*b*. The movable member 51 is composed of the three-phase AC coil 57 wound around the teeth portions 98. Applying current to the three-phase AC coil 57 allows the movable member 51 to move between the two stators 95*a* and 95*b*. As in the linear motor disclosed in FIG. 1, the linear based on this principle generates a magnetic attractive force between each of the stators 95*a* and 95*b* and the movable member 51.

The stators 95*a* and 95*b* of the surface magnet type linear motor offer a higher rigidity than the stators 52*a* and 52*b* shown in FIG. 1 because the stators 95*a* and 95*b* are composed of steel plates. However, with the conventional mounting structure that fixes only one of the rectangular parallelepipedic stators 95*a* and 95*b*, the stators 95*a* and 95*b* may be bent by the magnetic attractive force to change the gap. Thus, also in this motor, application of the linear motor structure according to the above embodiment enables effects similar to those of the above embodiment to be obtained.

In the linear motor described above in the present embodiment, the structure of the movable member 51 is as shown in FIGS. 1 and 4. However, the present invention is not limited to this aspect. The present invention is applicable to a linear motor of a type in which the structure of the movable member 51 is different from those shown in FIGS. 1 and 4 provided that the shape of the stator is similar to those shown in FIGS. 1 and 4.

The invention claimed is:

1. A linear motor mounting structure allowing mounting of a linear motor comprising:

two stators extending in parallel; and a movable member being movable between the two stators in a direction which the stators extend, the mounting structure comprising:

a base contacting bottom surfaces of the stators to fix the stators ;

two stator mounting members each provided on a corresponding side of the two stators and each extending from the base to a height substantially equal to but differing from a height of a top surface of the stator; and two plate like support members fixedly connected to the top surfaces of the respective two stators and top surfaces of the respective two stator mounting members having heights differing from the two stators, wherein an air gap is created between each of the stators and the movable member, a maximum allowable displacement of the air gap is defined as $\delta x$, a thickness of the plate-like support member is defined as t, a coefficient is defined as K, which is calculated from an air gap displacement that is caused when a plate-like support member having a known plate thickness is used to fixedly connect the top surfaces of the two stators and the top surfaces of the two stator mounting members, a magnetic attractive force exerted on the top surface of the stator is defined as Fm, a width of the plate-like support member is defined as W, an allowable stress of the plate-like support member material is defined as $\sigma$, the thickness t of the plate-like support member is set to $\sqrt[3]{\sqrt{\delta x/K}} \geqq t \geqq Fm/(W\sigma)$, and the bottom surface of each of the stators is fixed to the base, and the top surface of the stator is fixed to the corresponding stator mounting member via the corresponding plate-like support member.

2. The mounting structure for the linear motor according to claim 1, wherein the base and the two stator mounting members are integrated together so as to have a U-shaped cross section, the bottom surface of each of the stators is fixed to a bottom portion of the cross section U shape of the base, and the top surface of the stator is fixed to a top surface of a cross section U shape of the base via the corresponding plate like support member.

3. The mounting structure for the linear motor according to claim 1, characterized in that a gap is created between each of the stators and a side wall of the corresponding stator mounting member.

* * * * *